United States Patent [19]
Head
[11] 4,236,908
[45] Dec. 2, 1980

[54] SEALING GLASS ENVELOPES

[75] Inventor: Brian E. Head, Bexley, England

[73] Assignee: International Standard Electric Corporation, New York, N.Y.

[21] Appl. No.: 39,067

[22] Filed: May 14, 1979

[51] Int. Cl.[3] .............................................. C03B 23/08
[52] U.S. Cl. ........................................ 65/108; 65/110; 65/155; 65/156
[58] Field of Search ................. 65/108, 110, 111, 155, 65/156

[56] References Cited

U.S. PATENT DOCUMENTS

| | | | |
|---|---|---|---|
| 3,434,818 | 3/1969 | Chauvin | 65/155 X |
| 3,537,276 | 11/1970 | Pityo | 65/155 X |

*Primary Examiner*—Arthur D. Kellogg
*Attorney, Agent, or Firm*—John T. O'Halloran; Alfred C. Hill

[57] ABSTRACT

In a reed switch manufacturing machine the closed glass-sealing chamber is modified so that inert gas introduced during fusion of the glass envelope is directed onto the back of gold-plated reflectors in the chamber. This enhances the life of the reflectors resulting in an improved product quality and product yield.

4 Claims, 6 Drawing Figures

SEALING GLASS ENVELOPES

BACKGROUND OF THE INVENTION

This invention relates to fusing articles in a controlled atmosphere using a reflector adjacent the article to concentrate the heat energy onto the article to fuse it, and relates particularly although not exclusively to manufacturing magnetic reed contact units.

Magnetic reed contact units basically comprise a pair of reeds having blade portions which extend into opposite ends of a glass encapsulation envelope and overlap within the envelope, the ends of the envelope being sealed to the shanks of the reeds. The assembly of such contact units comprises a sequence of operations which can be performed automatically, for example, on a rotatable turret having a plurality of assembly heads.

During the assembly of these reed contact units we have experienced difficulties with the reflectors in that they become contaminated with a deposit which appears to emanate from the fused glass during sealing the ends of the glass envelope. Furthermore, the reflectors, which are made of copper plated with gold on a nickel base, suffer from diffusion of the gold owing to the high temperatures reached. In the past it has been a relatively simple matter to replace these reflectors at frequent intervals, but with or present high speed turret machine the replacement of these reflectors has become a major drawback.

SUMMARY OF THE INVENTION

It is an object of the present invention to try to overcome these problems.

According to the present invention there is provided a method of fusing an article in a controlled atmosphere in a sealed enclosure comprising placing the article adjacent a reflector, directing radiant heat energy at the reflector so that the energy is concentrated on the article to fuse it, and releasing a jet of gas in the vicinity of the article so as to minimize contamination of the reflector by the fused article.

According to a further aspect of the present invention there is provided apparatus for fusing an article comprising a sealed enclosure which can be opened, means for supporting the article within the enclosure, a reflector adjacent the position to be occupied by the article, radiant heating means for directing radiant heat onto the reflector, and a gas supply port opening in the vicinity of said position and connected to receive a gas supply, whereby in use a jet of inert gas can be released in the vicinity of the article so as to minimize contamination of the reflector by the fused article.

A further aspect of the invention resides in a fused article made by method or apparatus as described in either of the above preceding paragraphs.

Preferably the jet of gas is directed onto the rear of the reflector. Furthermore where one of the reflectors is required to move, particularly in the application to sealing magnetic reed contact units where the glass envelope is held to the same block which mounts one of the reflectors, this block has the gas supply port facing the rear of the reflector and a passage extends from the port through an interface between the block and a part which is fixed to the enclosure. Thus, the reflector and the glass tube can be moved during the gapping operation relative to the part which is fixed.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1A:
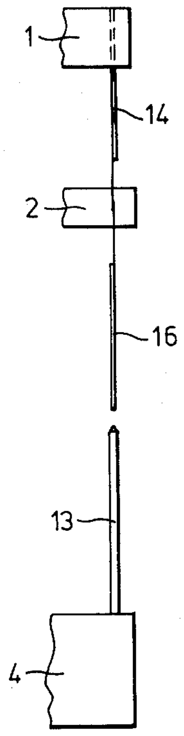
FIGS. 1*a* to 1*e* show diagrammatically the steps in the manufacture of a sealed reed contact unit in accordance with an embodiment of the present invention.
Figure 1B:
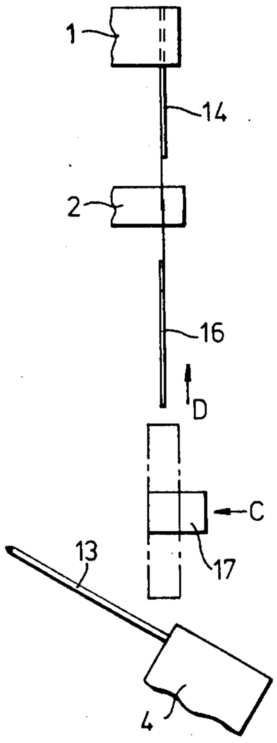
Figure 1C:
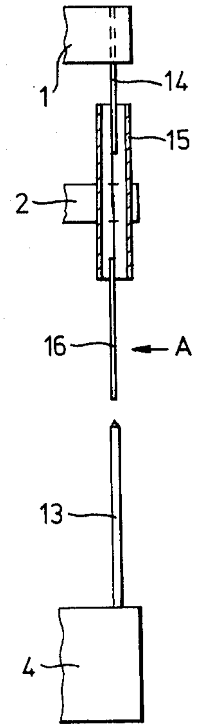

Referring to FIG. 1*a* a magnetic reed 14 is held in a mechanical clamp 1. The mechanical clamp 1 forms one pole of a magnetic circuit (not shown) which extends down to the bottom part 4 supporting a magnetic pin 13. A second magnetic reed 16 is introduced as shown in FIG. 1*a* and occupies the position shown. The magnetic circuit is energized and the reed is held in the position shown by the magnetic circuit. A mechanical clamp 2 is located intermediate clamp 1 and the part 4 for holding an open-ended glass envelope, as shown in FIG. 1*c*. The envelope is introduced in the direction C by a clamp 17 and initially occupies the position indicated by broken line in FIG. 1*b*. It is then moved up in the direction indicated by the arrow D until it has reached the position indicated in full line in FIG. 1*c* and referenced by numeral 15 and held by clamp 2.

The ends of the magnetic reeds 14 an 16 within the envelope 15 overlap one another as can be seen in the drawing. In order to introduce the glass envelope the pin 13 is allowed to pivot away from its first position in which it is aligned with the longitudinal axis of the tube and first magnetic reed, as shown in FIG. 1*b*.

Figure 1D:
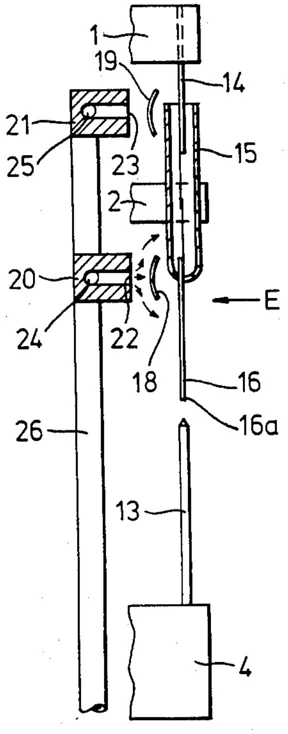

As shown in FIG. 1*d* the pin reverts to its initial position and longitudinal alignment of the magnetic reeds 14 and 16 is ensured by the magnetic circuit so that the outer tip 16*a* of magnetic reed 16 is aligned with the tip of the pin 13.

FIG. 1*d* shows for the first time (for the sake of clarity) reflectors 18 and 19 positioned adjacent the ends of the tube 15. These reflectors 18 and 19 are held by screws (not shown in FIG. 1 but shown more clearly in FIG. 2) to support blocks 20 and 21, respectively. These blocks each have a gas supply port 22 and 23, respectively, connected by respective passages 24 and 25 with a gas supply pipe 26. FIG. 1*d* shows the lower end of the envelope 15 being sealed to the reed 16 by means of radiant heat energy represented by the arrow E directed towards the reflector 18 which concentrates the energy onto the lower end of the envelope 15.

Just prior to the commencement of the sealing operation an inert gas, such as nitrogen, is supplied under pressure via the pipe 26 and passage 24 to produce a gas jet at the gas supply port 22. The little arrows in the vicinity of this port and the reflector 18 indicate diagrammatically the flow of the inert gas directed in the vicinity of the end to be sealed and impinging directly on the rear of the reflector 18. This continues during the application of radiant heat energy E until the lower end of the envelope 15 has been sealed to the reed 16.

Figure 1E:
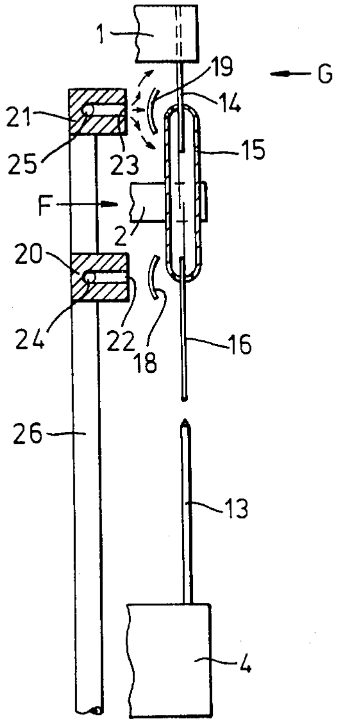

Referring to FIG. 1*e*, in preparation for sealing the upper end of the envelope 15 to the reed 14, the mechanical clamp 2 which holds the glass envelope is moved in the direction of the arrow F by an amount corresponding to the required gap between the overlapping ends of the magnetic reeds 14 and 16, as can be seen in FIG. 1e. The mechanical clamp 2 is, in this embodiment, secured to the supporting block 20 (the securing arrangement is not illustrated) and there is an interface between the end of the block 20 and a passage communicating with the pipe 26, which interface lies in a plane parallel to the plane of the paper. This interface enables the block 20 and thus the clamp 2 to slide.

Once the desired gapping movement has been provided, the magnetic circuit is de-energized and the overlapping ends of the reeds part and radiant heat energy in the direction of arrow G is directed towards the reflector 19.

Nitrogen is jetted from the gas supply port 23, impinging against the back of the reflector 19 and flows around it in the vicinity of the upper end of the envelope being sealed, as shown by the tiny arrows.

Each of the steps described in FIG. 1, the other intermediate steps not discussed above, are accompanished at various positions around a turret machine which carries, in this embodiment, twenty four similar assembly heads in sealed containers which open to allow the insertion of the reeds and the glass envelope and which are closed during the sealing and gas supply stages. In fact the gas is supplied under pressure above atmospheric and, in this embodiment, at a pressure approximately 5 times that of the atmosphere.

Figure 2:
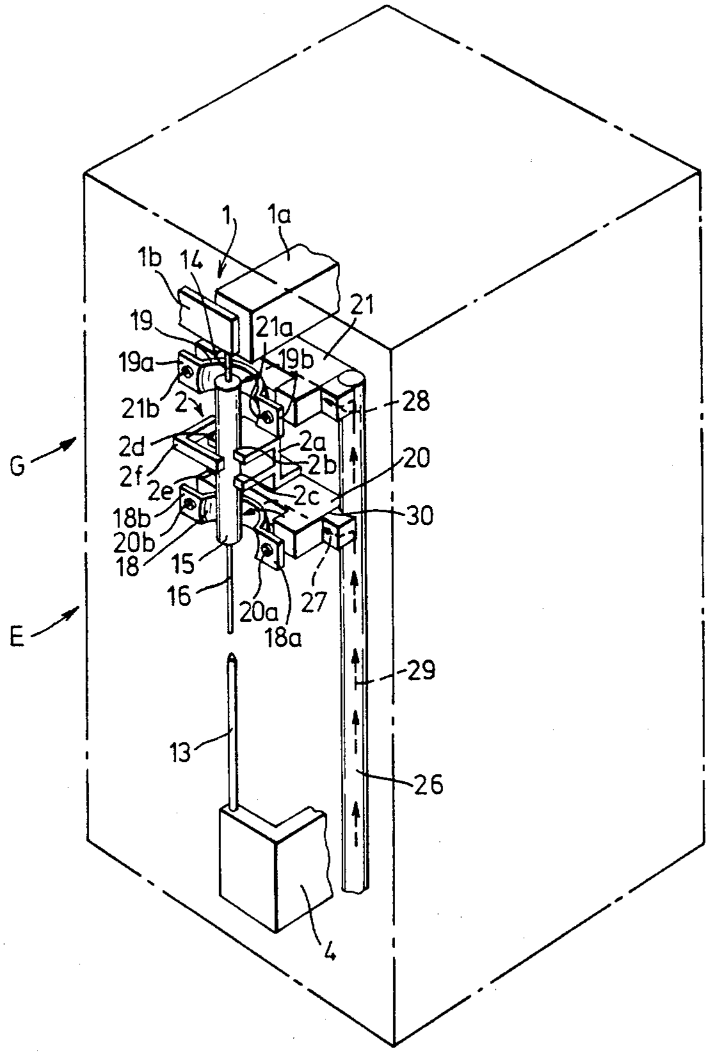
FIG. 2 shows schematically part of an assembly box of a rotary turret indexing machine suitable for carrying out the steps shown in FIG. 1.

FIG. 2 shows somewhat schematically one of the 24 assembly heads and the broken line indicates the outline of the sealed enclosure containing among other things parts to be described below. Parts which correspond to those already described in FIG. 1 have been given similar reference numerals. It is to be understood that the drawing is purely schematic and has been grossly simplified in order that the essential parts of the invention can be clearly understood. Reference can with advantage be had to our British Pat. Nos. 1,464,406 and 1,238,568 for a better understanding of other aspects of reed manufacture which, however, are not thought to be essential for an understanding of the present invention.

Referring now to FIG. 2 the mechanical clamp 1 comprises a pole 1a of the magnetic circuit and a spring-loaded clamping element 1b which clamp between themselves the reed 14. Just below the clamp 1 is the reflector 19 which is made of copper with a nickel flash and plated in gold. This is a substantially U-shaped structure with lugs 19a and 19b secured to the block 21 by means of screws 21a and 21b. Springs (not shown) between the lugs and the block 21 enable the position of the relfector 19 to be adjusted by screwing the screws 21a and 21b in or out as required. The block 21 and, therefore, the reflector 19 are fixed, by means not shown, relative to the enclosure.

Beneath the reflector 19 is the mechanical clamp 2 comprising a part 2a having a V-shaped notch 2b and 2c in respective lugs 2d and 2e. A pivotally mounted spring-loaded clamp member 2f holds the glass envelope 15 in the V-shaped notches.

Clamp part 2a is mounted by means not shown onto the block 20 on which, in turn, is mounted the reflector 18 by means of screws 20a and 20b. Springs (not shown) are located between lugs 18a and 18b of the reflector and the block 20 to enable adjustment of the position of reflector 18 in the same manner as set forth hereinabove with respect to reflector 19.

The gas supply pipe 26 is in the form of a manifold which supplies both the block 20 and the block 21 with gas during the sealing of the ends of the envelope. Arrows 29 and 28 and 27 indicate diagrammatically the passage of the gas up through the pipe and into the blocks 20 and 21. The gas emerges from the blocks 20 and 21 against the back of the reflectors 18 and 19 as previously described. The passageways 24 and 25 and the gas supply ports 22 and 23 described with reference to FIGS. 1d and 1e are not shown in FIG. 2, but they nevertheless exist there.

The interface is indicated by the reference numeral 30 between a surface of an extension on the pipe 26 and the end of the block 20, where the arrow indicated by the reference numeral 27 passes across.

We have found that directing the inert gas in the vicinity of the ends of the envelope during sealing has minimized if not eliminated a contaminating deposit which rapidly formed on the surfaces of the reflectors. Furthermore, by directing the gas jet to impinge on the rear of the reflectors, not only is the glass while molten protected from the direct force of the gas jet, but the reflector is cooled and, thus, burning of the reflector surfaces and diffusion of the gold is very significantly reduced.

It is envisaged that the gas jets and passageways could be organized differently. For example, they need not be provided in the blocks which support the reflectors, but they could be provided instead in another structure within the enclosure. The exact reason why the dramatic improvement is accomplished in not completely understood, but it is believed to be due to the turbulent moving gas in the vicinity of the ends of the envelope being sealed which prevents the contaminating deposit occurring in combination with a direct cooling of the reflectors by contact with the impinging gas jet.

Generally a stable operating condition has been provided and this has a significant effect on product quality and yield.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of fusing an article in a controlled atmosphere in a sealed enclosure comprising the steps of placing said article in said enclosure adjacent a solid reflector, directing radiant heat energy at said article to be fused and a front reflecting surface of said reflector to fuse said article, and releasing a jet of inert gas onto a back surface of said reflector remote from said article to minimize contamination of said reflector by said fused article and to cool said reflector.

2. Apparatus for fusing an article comprising a sealed enclosure which can be opened, means for supporting said article within said enclosure, a solid reflector disposed in said enclosure adjacent a position to be occupied by said article, radiant heating means for directing radiant heat onto said article and a front reflecting surface of said reflector to fuse said article, and a gas supply port opening in the vicinity of said position and connected to an inert gas supply to release a jet of inert gas onto a back surface of said reflector remote from said article to minimize contamination of said reflector by said fused article and to cool said reflector.

3. Apparatus as claimed in claim 2, wherein said reflector is mounted on a support having said port therein and a passage extends from said port through an interface between said support and a part which is fixed to said enclosure to enable said reflector to be moved relative to said part.

4. Apparatus for manufacturing sealed magnetic reed switch units comprising a sealed enclosure, means disposed in said enclosure for supporting a pair of magnetic reeds so that their operative ends overlap one another, a clamp disposed in said enclosure for supporting an open ended glass envelope around said pair of reeds so that said overlapping ends lie within said glass envelope, a pair of curved solid reflectors each disposed in said enclosure adjacent a different end of said envelope for reflecting and focussing radiant heat energy directed through said enclosure onto the respective open ends of said envelope to close and seal said open ends around the respective magnetic reeds so that said reeds become held in said ends of said envelope, and a pair of gas supply ports each disposed in said enclosure to direct a jet of inert gas onto a surface of a different one of said pair of reflector remote from said envelope during closing and sealing said envelope ends to cool said pair of reflectors and minimize contamination of said pair of reflectors by said glass envelope during closing and sealing said envelope ends.

* * * * *